UNITED STATES PATENT OFFICE.

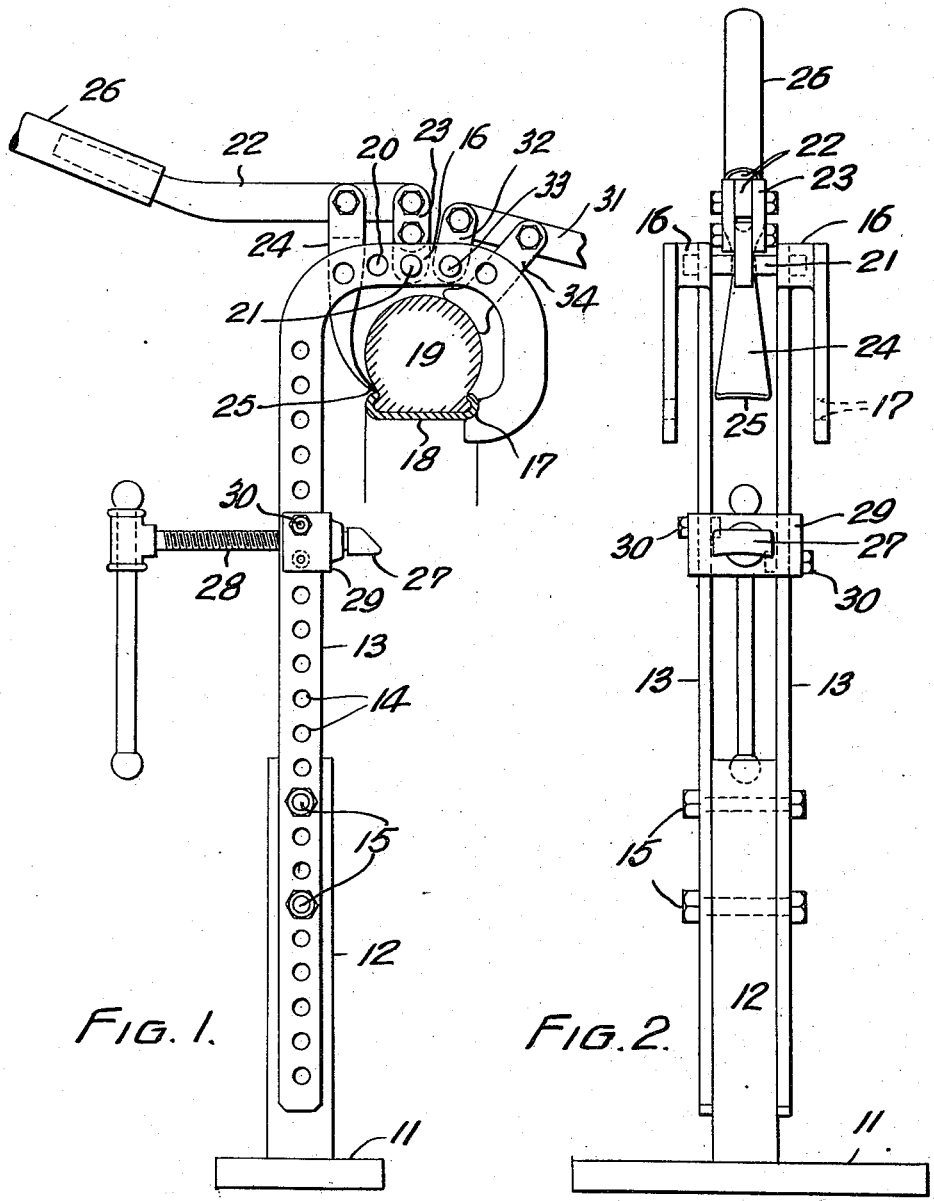

GEORGE L. KAVANAGH, OF MONTREAL, QUEBEC, CANADA.

TIRE REMOVING AND APPLYING DEVICE.

1,217,009.  Specification of Letters Patent.  Patented Feb. 20, 1917.

Application filed May 20, 1915. Serial No. 29,327.

*To all whom it may concern:*

Be it known that I, GEORGE L. KAVANAGH, a citizen of the United States, and resident of the city of Montreal, in the Province of Quebec and Dominion of Canada, have invented certain new and useful Improvements in Tire Removing and Applying Devices, of which the following is a full, clear, and exact description.

This invention relates to improvements in tire removing and applying apparatus, and the object of the invention is to provide a simple, inexpensive and effective apparatus for removing tires from clencher rims.

It frequently happens that a tire remains on the rim for a considerable length of time, and becomes rusted thereto, so that it is very difficult to remove, especially if the tire be of large size. The removal of a tire even in the garage with the ordinary tire tools is a long and tedious operation, and frequently requires the services of two or more men.

With the apparatus forming the subject of this invention, the largest and most badly rusted on tire, whether solid or pneumatic, may be quickly and easily removed by one man. The apparatus may also be used in applying tires to the rims.

The device consists essentially of an upright framework adapted to embrace the tire and form a support for the rim, on the inner side of the rim or wheel. A lever carrying a suitably formed tool is pivotally connected to the frame, and when operated forces the bead of the tire out of engagement with the rim through the medium of the tool. A jack screw is provided to replace the lever when dealing with large or badly rusted tires. A small attachment provided with the tool enables the device to be used in applying tires.

In the drawings which illustrate the invention:—

Figure 1 is a side elevation of the device.
Fig. 2 is an edge elevation.

Referring more particularly to the drawings, 11 designates a base upon which a column 12 is mounted. A framework comprising a pair of similar members 13 having apertures 14 therein is attached to the column by means of bolts 15, passing through certain of the apertures 14. The upper part of the frame members 13 is laterally and then downwardly, and then inwardly bent, as clearly shown in Fig. 1, to form a jaw of size and shape suitable to embrace any tire from the smallest to the largest. In the laterally bent portion, the frame members 13 are offset away from one another, as shown at 16, so as to space the ends wider apart and impart stability to the device when in use. The extremity of each member forming the jaw is recessed at 17 to form a seat for the edge of the clencher rim 18 of a tire 19. The upper part of the jaw is provided with a series of apertures 20, in any one of which a pin 21 may be inserted. The pin is connected with one extremity of a lever 22 by a link or links 23. Between the extremities of the lever, a tool 24 is provided having the end 25 thereof comparatively thin and curved, as shown in Fig. 2, to adapt itself to the side wall of a tire immediately above the rim. For operating with large tires, a tubular extension 26 for the handle may be provided.

If the tire is large or badly rusted to the rim, a greater force is required than can be conveniently applied with the lever 22. This lever and its tool may be swung up out of the way or entirely detached by removal of the pin 21 and replaced by the tool 27 which is curved as previously described, and is revolubly mounted at the end of a jack screw 28 mounted in a plate 29 adjustably secured to the frame members by bolts 30 passing through the apertures 14. These bolts are considerably smaller than the apertures, as will be clearly seen, so that the jack screw will have a certain rocking or oscillating movement.

For applying tires, an additional lever 31 may be connected to any one of the apertures 20 by a link 32 and pin 33. This lever carries a broad blunt-ended tool or plunger 34, shaped to bear uniformly on a comparatively large surface of the tire tread.

The operation of the invention is extremely simple. Whether the rim carrying the tire be dismounted from the wheel or still on the wheel, the frame is adjusted on the column 12, so that when the rim is engaged in the seats 17 of the jaw, the tire will be clear of the floor. The device is then moved in the plane of the wheel, so that the jaw embraces the upper part of the tire and the rim rests in the seats 17. The lever 22 is then depressed, the tool being guided against the side wall of the tire immediately above the rim. Pressure on the lever forces the end of the tool inwardly, thus driving the side wall of the tire in and disengaging the bead from the rim. Owing to the double link suspension of the lever and the expansion of the compressed tire, there is a tendency to upward movement on the part of the bead when once released from the rim, so that a strip of metal or any suitable tool may be inserted between the tire and rim to prevent return of the bead into engagement with the rim. The lever is now raised to release the tool, and the tire revolved a suitable portion of a revolution, and the operation repeated. After a very few such operations, sufficient length of the tire will be free from the rim to be levered over the rim, thus bringing the tire into condition for easy removal with the hands. If the tire is very large or is badly rusted to the rim, the lever 22 and tool 24 may be thrown up out of the way or removed by withdrawal of the pin 21, and the tool 27 brought into use. This is effected by removing the bolts 30 and sliding the plate 29 up on the frame unitl the working end of the tool 27 is in the position formerly occupied by the end of the tool 24. The bolts 30 are then inserted through suitable holes but left somewhat loose, so that there will be sufficient play between the bolts and the large holes which they occupy to permit limited tilting or oscillation of the screw 28 carrying the tool. When the screw is rotated, it drives the tool against the tire with great force, and will break away the worst rusted-on tire. When the tire is free, the screw may be tilted to raise the bead thereof above the rim for the insertion of some tool to hold the tire from returning. The screw is now loosened, the tire moved, and the operation repeated as often as necessary. It will be readily seen that the upper part of the frame forms in reality a vise, one side holding the rim and the other side the tire.

The device may be used for putting on tires in much the same way. One bead of the tire is first gotten on the rim, which is usually a comparatively easy undertaking. The device is then applied to the rim and the lever 22 operated as previously to compress the tire and force the bead back of the rim edge. The lever 31 is then depressed, so that its tool 34 presses down on the tire and forces the bead against the rim.

Having thus described my invention, what I claim is:—

1. A tire tool comprising a stand adapted to rest on the ground, an adjustable head for said stand embracing the tire and engaging the wheel, a tire bead compressing and raising element pivotally mounted in the head, and a tire bead compressing and depressing element pivotally mounted in the head independent of said raising element.

2. In a device of the class described, a stand and support for tire tools comprising a base, a column thereon, a pair of similar flat members adjustably supported on said column, the upper portion of said members being bent forwardly, then downwardly, then inwardly to embrace the tire, said members being offset in their forwardly bent portions and provided with a recess on their inward extremities to receive the rim of the wheel.

In witness whereof, I have hereunto set my hand, in the presence of two witnesses.

GEORGE L. KAVANAGH.

Witnesses:
S. R. W. ALLEN,
G. M. MORELAND.

Copies of this patent may be obtained for five cents each, by addressing the "Commissioner of Patents, Washington, D. C."